(12) United States Patent
Flockhart et al.

(10) Patent No.: US 6,192,122 B1
(45) Date of Patent: Feb. 20, 2001

(54) CALL CENTER AGENT SELECTION THAT OPTIMIZES CALL WAIT TIMES

(75) Inventors: Andrew D. Flockhart, Thornton, CO (US); Robin Harris Foster, Little Silver, NJ (US); Roy A. Jensen, Westminster; Joylee E. Kohler, Northglenn, both of CO (US); Eugene P. Mathews, Barrington, IL (US)

(73) Assignee: Avaya Technology Corp., Miami Lakes, FL (US)

( * ) Notice: Under 35 U.S.C. 154(b), the term of this patent shall be extended for 0 days.

(21) Appl. No.: 09/022,959

(22) Filed: Feb. 12, 1998

(51) Int. Cl.$^7$ ..................................... H04M 3/523
(52) U.S. Cl. ........................... 379/266; 379/266; 379/309
(58) Field of Search ..................................... 379/265, 266, 379/309, 207

(56) References Cited

U.S. PATENT DOCUMENTS

| | | | |
|---|---|---|---|
| 5,206,903 | * 4/1993 | Kohler et al. | 379/309 |
| 5,299,260 | 3/1994 | Shaio | 379/265 |
| 5,335,269 | 8/1994 | Steinlicht | 379/265 |
| 5,467,391 | 11/1995 | Donaghue, Jr. et al. | 379/265 |
| 5,721,770 | * 2/1998 | Kohler | 379/266 |
| 5,825,869 | * 10/1998 | Brooks et al. | 379/265 |
| 5,828,747 | * 10/1998 | Fisher et al. | 379/309 |
| 5,864,616 | * 1/1999 | Hartmeier | 379/266 |
| 5,903,641 | * 5/1999 | Tonisson | 379/266 |
| 5,905,793 | * 5/1999 | Flockhart et al. | 379/266 |

OTHER PUBLICATIONS

TP 29102 A (Anonymous) Feb. 25, 1991 (abstract) World Patents Index [online]. London, U.K.: Derwent Publications, Ltd. [retrieved on Jan. 13, 2000]. Accession No. 1991–080163.*

U. S. patent application, A. V. Tonisson 1, Ser. #08/790,010, "Automatic Dynamic Changing of Agents' Call–Handling Assignments", Filed Jan. 28, 1997.

U. S. patent application, Flockhart–Mathews 3–4, Ser. #08/552,642, "Arrangement for Queuing a Call to the Best Split", Filed Nov. 3, 1995.

U.S. patent application, Flockhart–Mathews 4–5, Ser. #08/552,641, "Arrangement for Queuing a Call to the Best Backup Split", Filed Nov. 3, 1995.

*Definity® Communications System Generic 3; Call Vectoring/Expert Agent Selection (EAS) Guide*, 555–230–520, Issue 3, Nov. 1993, 1–1–8–24.

* cited by examiner

*Primary Examiner*—Scott L. Weaver
*Assistant Examiner*—Roland G. Foster
(74) *Attorney, Agent, or Firm*—David Volejnicek

(57) ABSTRACT

Selection of a suitable call-center agent (106–108) to handle a call is based on which available suitable agent's handling of the call will tend to optimize call wait times. When a call needing a particular skill becomes available (200), all skills of agents in the agent queue (131–139) corresponding to the particular skill are determined (202, 204). The agent queues corresponding to the determined skills are checked (206) to determine which ones identify only one agent. For each available agent having the particular skill, the number of agent queues which identify this agent as their only agent is computed (208). The available agent having the lowest computed number is selected (210) to handle the call. This minimizes the number of skills that will be left without an available agent to handle subsequent calls, and thus tends to maximize the probability that a next call will also have a suitable agent already available and not have to wait for one to become available, thereby optimizing call wait times.

8 Claims, 2 Drawing Sheets

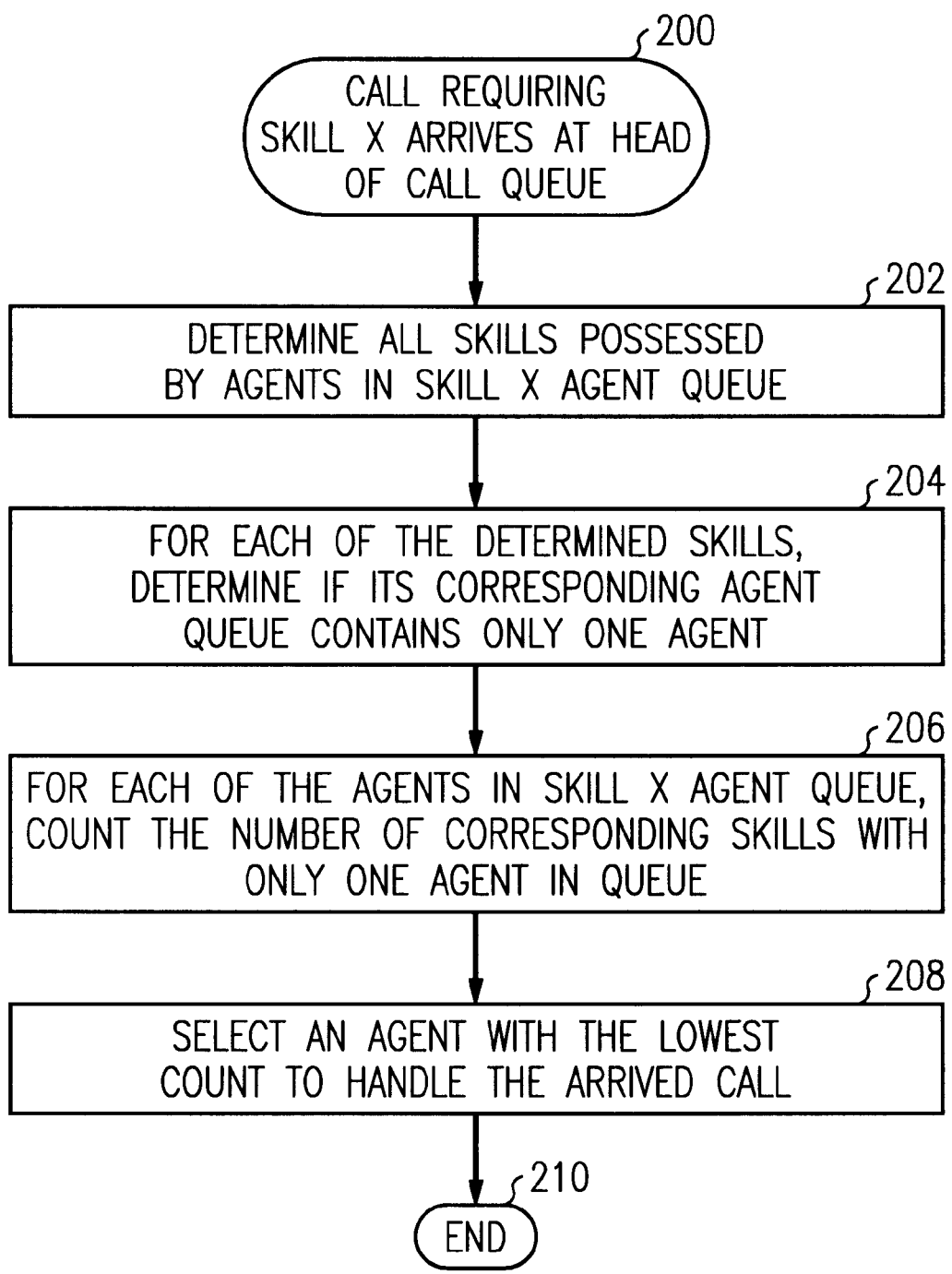

CALL CENTER AGENT SELECTION THAT OPTIMIZES CALL WAIT TIMES

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls matching any of the agent skills waiting to be handled.

When a plurality of agents are available to handle a call, any one of a number of agent-selection algorithms are presently employed to select one of the available agents. "Uniform call distribution", "most idle agent", and "least occupied agent" algorithms seek to optimize agent fairness. And an "expert agent distribution" algorithm seeks to optimize quality of service. None of these algorithms, however, attempt to select an available agent in such a way that maximizes probability that a next (future) call will also find a suitable agent already available and not have to wait for one to become available.

SUMMARY OF THE INVENTION

This invention is directed to solving this and other problems and disadvantages of the prior art. According to the invention, selection of a handler (e.g., a call center agent) having a skill to handle a communication (e.g., a call center call) needing the skill is effected as follows. A determination is made of which ones of a plurality of handlers both have at least the skill that's needed by the communication and are available (e.g., idle) to handle the communication. All skills that the determined handlers have are then determined. For each determined skill, it is determined whether only one available handler has that skill. Finally, a determined handler who is the only available handler for fewest—preferably none—of the determined skills is selected to handle the communication.

While a method according to the invention comprises the steps of the just-characterized procedure, an apparatus according to the invention effects the method steps. The apparatus preferably includes an effector—any entity that effects the corresponding step, unlike a means—for each step. Further, there is preferably provided a computer-readable medium containing software which, when executed on a computer, causes the computer to perform the method steps.

The selection procedure characterized above minimizes the number of skills that will be left without an available handler with that skill to handle subsequent communications. It thus tends to maximize the probability that a next communication will also have a suitable handler already available and not have to wait for one to become available, thereby tending to optimize wait times of communications for handlers.

These and other advantages and features of the invention will become more apparent from the following description of an illustrative embodiment of the invention considered with the drawing.

BRIEF DESCRIPTION OF THE DRAWING

FIG. 2 is a flow diagram of an agent-selection procedure performed by an agent and call selector of the call center of FIG. 1.

DETAILED DESCRIPTION

Figure 1:
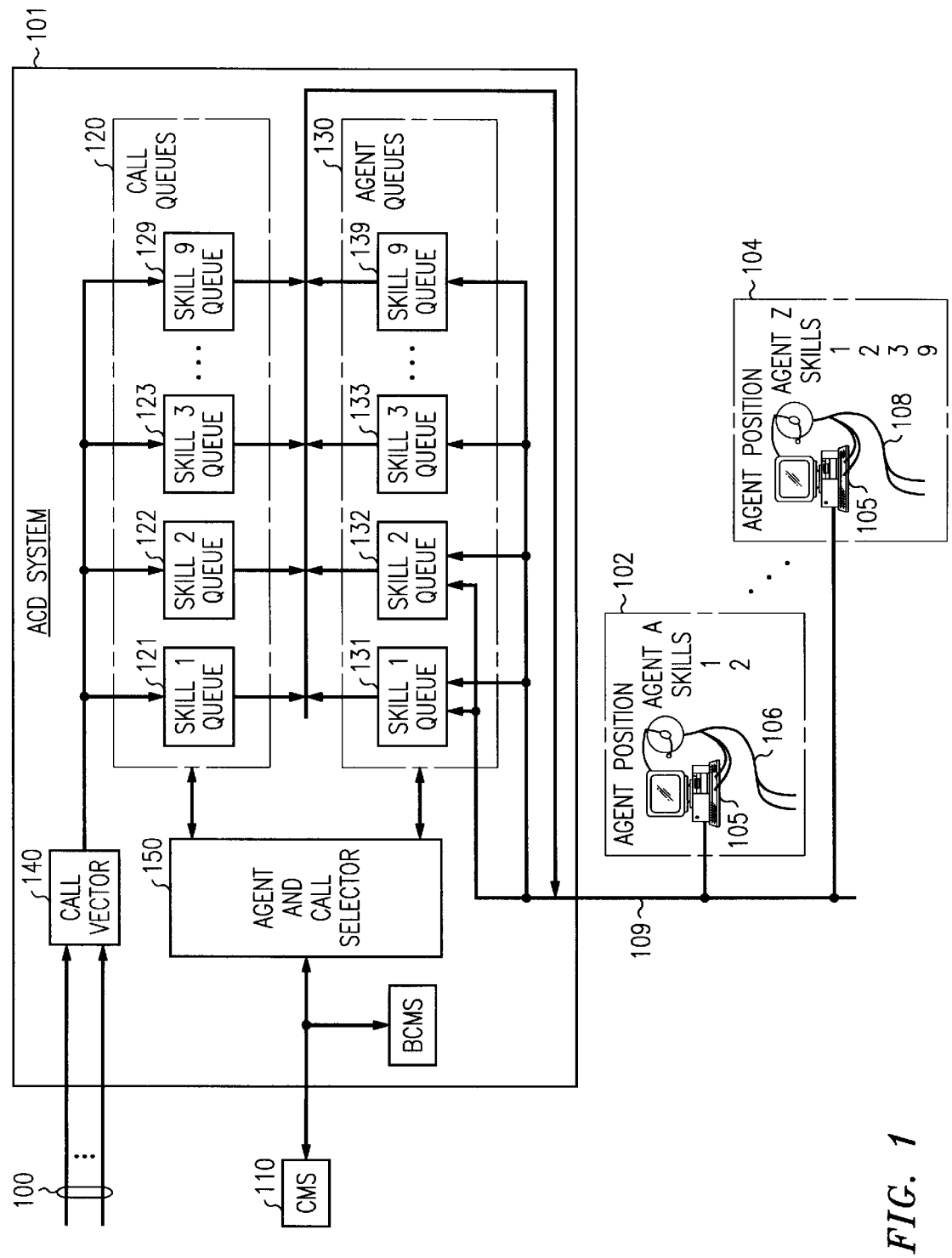
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic call-distribution functionality. Included among the data stored in ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 is a call vector 140. Calls incoming to the call center on lines or trunks 100 are assigned by call vector 140 to different call queues 121–129 based upon the agent skill that they require for their proper handling. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, November 1993). Skills-based ACD is described in further detail in U.S. Pat. No. 5,206,903.

According to the invention, included among the programs executing on ACD system 101 is an agent and call selector 150. Selector 150 is stored either in the main memory or in a peripheral memory (e.g., disk, CD ROM, etc.) or some other computer-readable medium of ACD system 101. Selector 150 effects an assignment between calls and available agents in a way that tends to maximize the probability that a next call will also have a suitable agent already available and not have to wait for one to become available. Selector 150 thus tends to optimize wait times for calls.

The functionality implemented by an illustrative embodiment of selector 150 is shown in FIG. 2, which shows the agent-selection procedure that is performed by selector 150 when a call that is determined to require a skill x for its handling becomes available (i.e., arrives at the head of skill x queue in call queues 120, for purposes of this example), at step 200. In response, selector 150 selects the best idle agent with skill x to handle the call, as follows. For all idle agents with skill x (i.e., for each agent in skill x queue), selector 150 determines all of their skills, at step 202. Each agent's full complement of skills is retrieved from that agent's stored record which contains information describing the agent. Then, for each of the skills determined at step 202, selector 150 checks the corresponding skill queue in agent queues 130 to determine if it contains only one agent, at step 204. If an agent queue 131–139 contains only one agent, it means that assignment of that agent to handle a call would leave the queue's corresponding skill queue empty, and hence would leave other calls requiring this queue's corresponding skill without an available agent to handle the call. Alternatively, instead of checking the agent queues for each of the agents' skills, selector 150 checks the agent queues of only those skills that are not duplicated among the idle agents in skill x queue. Then, for each of the agents in skill x queue, the number of the agent's skills whose corresponding agent queue contains only one agent is counted (added up), at step 206. This is the number of skills that would lose their last available agent if this agent handled the presently-available call requiring skill x. The agent with the lowest count is then selected to handle the call, at step 208. If a plurality of agents have the same lowest count, any one of them is selected—for example, the "most idle" agent. In this way, the number of skills with an available agent is maximized, whereby the next available call has the best chance of finding an agent available to immediately service it. The agent-selection procedure then ends, at step 210, until a next call becomes available for handling.

With this new agent selection procedure, a call center can improve call-service times without increasing staff (i.e., the number of agents). This is illustrated by the following example, even though it is simplified and exaggerated. Assume that a call center has two skills—x and y—and two agents—Fred and Joe. Fred has only skill x. Joe has both skills x and y, and has been available the longest. The average call-handling (talk time plus any after-call work) time for skills x and y is 180 seconds. A call arrives for skill x, followed by arrival of a call for skill y. If the traditional "most idle agent" selection algorithm were used, Joe would take the first arriving call, and the second arriving call would have to wait 180 seconds before Joe would become available again to take the second call. But with the agent selection made according to this is invention, Fred is selected to take the first arriving call and Joe is selected to take the second arriving call. Neither call has to wait for an agent to become available. The average speed of answer for skill y is thus improved without adding additional staff.

Of course, various changes and modifications to the illustrative embodiment described above will be apparent to those skilled in the art. For example, use of the invention is not limited to use with ACD systems and agents, but may be used in any situations where communications are handled by a staff of handlers. Nor do those handlers have to be in queues; one could just count all the available agents. Also it may be used to select only from among the most-skilled available handlers. Or, the basic idea of selecting agents so as to deplete the agent queues for as few skills as possible may be expanded to take into consideration a ranking or a weighting of skills, derived from acceptable service-level targets that have been set for the skills. One variation is to compare a weighted total of skills for individual agents— one or more types of calls may be much more important than others, so that the call center may be willing to let many agent queues for less important skills to be emptied for the sake of keeping staffed the skills for these important kinds of calls. A second variation is to rank-order the skills in terms of importance in preserving their agent queues non-empty. Then the available agent who empties the least important of the skill queues in that rank order is assigned to handle a call. Both of these variations can be automatically effected through the service levels that a call has defined for each skill. For example, consider the "yellow" service levels. Divide all of the yellow levels by the smallest (tightest) threshold and take the inverse to get a weighting.

| Skill A | Yellow 10 sec  | Weight = 1   | Rank = 1 |
| Skill B | Yellow 15 sec  | Weight = .66 | Rank = 2 |
| Skill C | Yellow 50 sec  | Weight = .20 | Rank = 3 |
| Skill D | Yellow 50 sec  | Weight = .20 | Rank = 3 |
| Skill E | Yellow 100 sec | Weight = .10 | Rank = 4 |

If Jane has skill B, D, and E, her weighted skill factor is 0.66+0.2+0.2+0.1=1.16. Jane's Rank order skill factor is 2. If Tim has skill A and E, his weighted skill factor is 1.1. Tim's skill rank is 1. Now assume that a call needing skill E arrives. If the first variation that was outlined above is used, based on a weighting of the skills, Tim is selected to handle the call because his weighting is lower (1.1 compared to 1.16). If the second variation is used, Jane is selected to handle the call because her rank-order skill factor is 2, compared to Tim's 1. Yet another variation is to use the call center's data on the revenue generated per call for each skill as the weighting or ranking factor. This information is either obtained via administration by the call center manager or is periodically determined and updated through real-time analysis effected outside of the ACD. If the numbers in terms of sales start to rise for one skill relative to other skills, the importance of having someone around to answer that one skill increases. Cost-centered service calls can be accounted for relative to revenue-generating calls by being given a fixed position in the ranking, and the revenue calls are allowed to float in real-time based on real-time data. Such changes and modifications can be made without departing from the spirit and the scope of the invention and without diminishing its attendant advantages. It is therefore intended that such changes and modifications be covered by the following claims.

What is claimed is:

1. A method of selecting a handler having a skill to handle a communication needing the skill, comprising the steps of:

determining which ones (determined handlers) of a plurality of handlers (available handlers) who are available to handle communications have at least the skill needed by the communication;

determining all skills (determined skills) that the determined handlers have;

for each determined skill, determining whether only one available handier of the plurality of available handlers has the determined skill; and selecting a determined handler who is, for fewest of the determined skills, an only one available handler who has the determined skill, to handle the communication.

2. The method of claim 1 wherein:

the step of determining all skills comprises the step of for each said determined handler, determining all skills of said determined handler; and the step of determining whether only one available handler has the determined skill comprises the step of for each determined skill of each said determined handler, determining whether said determined handler is an only available handler who has the determined skill.

3. The method of claim 1 in an apparatus having a plurality of queues each corresponding to a different skill and each for identifying available handlers who have the corresponding skill, wherein:

the step of determining whether only one available handler has the determined skill comprises the step of determining queues corresponding to any of the determined skills that identify only one handler; and the step of selecting comprises the step of selecting a determined handler who is identified by fewest of the determined queues.

4. The method of claim 3 wherein:

the plurality of handlers comprise call center agents.

5. The method of claim 4 wherein:

the communication comprises a call.

6. An apparatus that performs the method of claim 1 or 2 or 3 or 4 or 5.

7. A computer-readable medium containing software which, when executed in a computer, causes the computer to perform the steps of claim 1 or 2 or 3 or 4 or 5.

8. An apparatus for selecting a handler having a skill to handle a communication needing the skill, comprising:

a first effector of determining which ones (determined handlers) of a plurality of handlers (available handlers) who are available to handle communications have at least the skill needed by the communication;

a second effector, cooperative with the first effector, of determining all skills (determined skills) that the determined handlers have;

a third effector, cooperative with the second effector, of determining, for each determined skill, whether only one available handler of the plurality of available handlers has the determined skill; and a fourth effector, cooperative with the third effector, of selecting a determined handler who is, for fewest of the determined skills, an only one available handler who has the determined skill, to handle the communication.

* * * * *